UNITED STATES PATENT OFFICE.

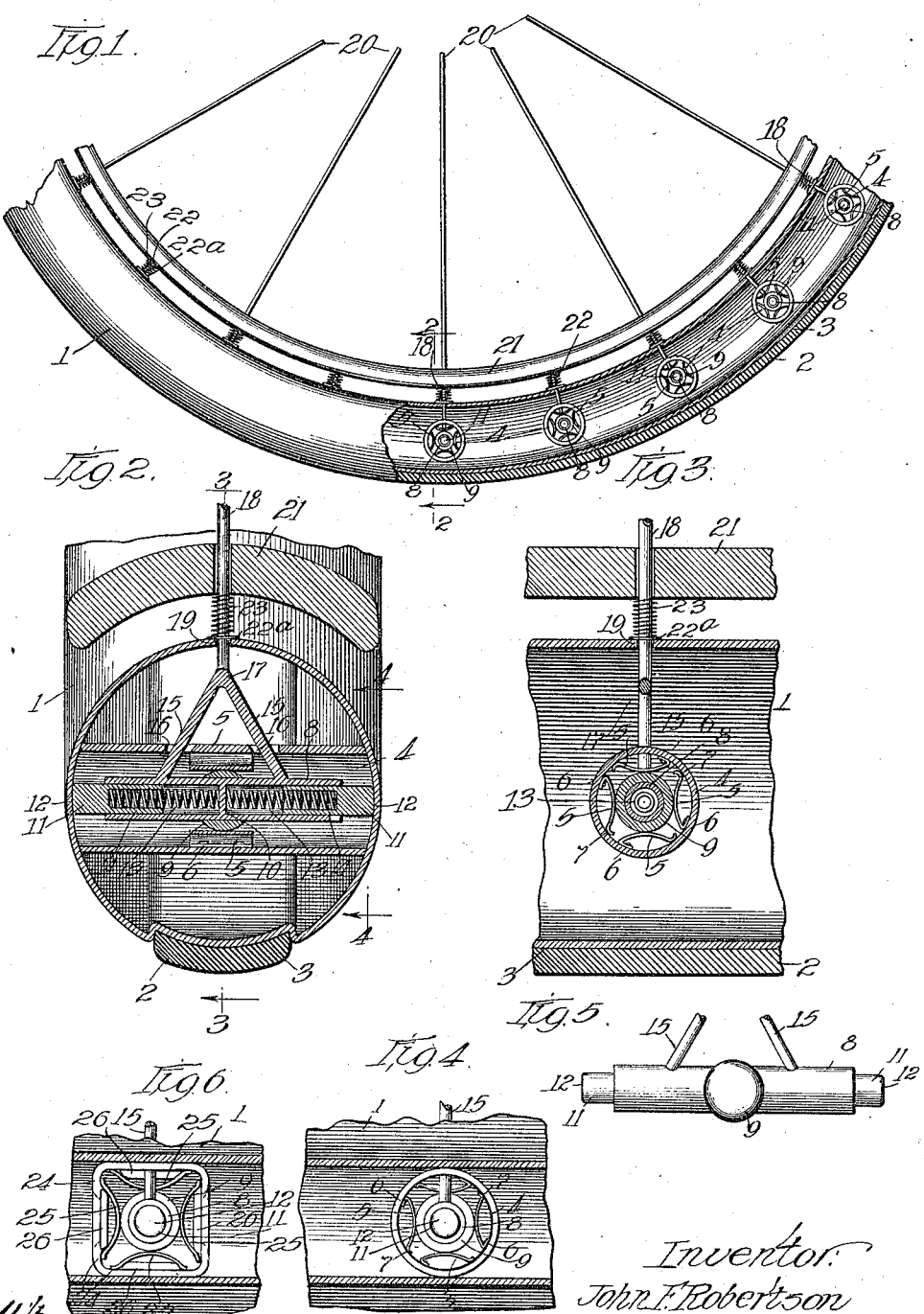

JOHN F. ROBERTSON, OF CHICAGO, ILLINOIS.

VEHICLE-WHEEL.

1,180,317.   Specification of Letters Patent.   Patented Apr. 25, 1916.

Application filed April 5, 1915. Serial No. 19,097.

*To all whom it may concern:*

Be it known that I, JOHN F. ROBERTSON, a citizen of the United States, residing at Chicago, in the county of Cook and State of Illinois, have invented certain new and useful Improvements in Vehicle - Wheels, of which the following is a full, clear, concise, and exact description, reference being had to the accompanying drawing, forming a part of this specification.

My invention relates to improvements in vehicle wheels, particularly automobile wheels.

Among the objects of my invention is to provide an improved wheel which shall be simple in construction and efficient in use, and which will have the advantages, without the disadvantages, of the pneumatic tire.

In the accompanying drawing, in which I have illustrated two embodiments of my invention, Figure 1 is a side elevation of a portion of a wheel constructed in accordance with my invention, the annular tubular member being shown partly in section to show the supports within the casing and the connection of the spokes with these supports; Fig. 2 is a section on the line 2—2 of Fig. 1 showing in detail the yielding connection between the spoke and the tubular support within the annular casing; Fig. 3 is a section on the line 3—3 of Fig. 2 showing in detail the leaf springs forming part of the yielding connection between the spoke and tubular support; Fig. 4 is a section on the line 4—4 of Fig. 2; Fig. 5 is a detail view showing a part of the connection between the spoke and tubular support; and Fig. 6 is a sectional view of a modification taken on the same plane as Fig. 4 showing a different form of tubular support and supporting springs.

Referring now to the drawing in detail I have shown my invention in connection with a vehicle wheel comprising an annular tubular casing 1 provided with a rubber tread 2 which may be attached in any desirable way, a convenient method being to provide a recess 3 in the casing and having the rubber tread 2 fitted therein, as shown in Figs. 2 and 3.

The casing 1 is provided at regular intervals with transversely extending supporting tubes 4 which are rigidly secured at their ends to the casing 1 in any suitable manner. Within each of these tubes 4 at its middle portion, are placed a number of bow springs 5 which are fastened to the tube 4 at one end only in any suitable manner, as by means of rivets 6, as shown in Fig. 3, the other end 7 of the springs being free and a sufficient distance being left between the springs to permit of the end 7 of each spring sliding on the interior surface of the tube in which it is placed to permit movement of said spring. A smaller tube 8 is placed within each of the larger tubes 4 and said tube 8 has a central portion enlarged into a spherical portion 9 which bears against the springs 5. The tube 8 is provided with a transverse partition 10 secured therein in any suitable manner and with plungers 11, the outer ends 12 of which are shaped to conform to the shape of the inner surface of the outer casing 1 against which said plungers are held in constant contact by means of the springs 13 each of which bears against the transverse partition 10 and one of the plungers 11 in which is preferably formed the recess 14 to receive a portion of the spring 13. To the upper surface of each of the smaller tubes 8 are attached the rods 15 on either side of the spherical portion 9, and said rods extend and are movable through slots 16 formed in the upper surface of each larger tube 4 and unite at a point 17 within the outer casing 1 from which point the single rod portion 18 extends inwardly and is movable through the aperture 19 formed in the outer casing, and is attached to or continued to form one of the spokes 20 of the wheel, or is rigidly attached to the rim 21 of the wheel, as is shown at 22.

For the purpose of preventing dust getting into the outer casing 1 through the aperture 19, I provide a cap 22$^a$ of metal or other suitable material, fitting tightly around the rod 18 and held in place to cover said aperture 19 by the spiral spring 23 around said rod 18.

It will be noted that the tube 8 and spherical portion 9 are yieldingly mounted for substantially universal movement within the tubular supporting members 4; the leaf or bow shaped springs 5 take care of the up and down movement and the springs 13 and plungers 11 take care of the side movement.

In Fig. 6 I have shown a modification of the tubular supports for the yielding connection with the spokes which tubular support 24 is rectangular in cross section and has centrally located therein four bow or leaf springs 25, both ends of which are free to move under pressure and which springs are held in place within the tubular support 24 by means of positioning lugs 26 which may be struck up from the center of the tubular support. In this modification the construction of the sleeve 8, spherical portion 9, plungers 11 and connecting rods 15 is substantially the same as in the modification of Figs. 1 to 5. It would also be possible to substitute other forms of springs in place of the springs 5 and 25 without departing from the spirit of my invention.

Having thus described my invention what I claim as new and desire to secure by Letters Patent, is;—

1. A vehicle wheel comprising a rigid outer casing with a series of apertures formed in its inner surface, a plurality of tubes transversely disposed at regular intervals within said casing, with apertures formed on the inner surface of each tube, a plurality of springs disposed within each of said tubes, a bar disposed within each of said tubes bearing against said springs, and a series of rods rigidly attached to a portion of the wheel lying within the outer casing and adapted to pass movably through said apertures in said outer casing and said tubes and be attached to said bars.

2. A vehicle wheel comprising a rigid outer casing with a series of apertures formed in its inner surface, a plurality of tubes transversely disposed at regular intervals within said casing, with apertures formed on the inner surface of each tube, a plurality of bow shaped springs disposed within each of said tubes, a bar disposed within each of said tubes bearing against said springs, and a series of rods rigidly attached to a portion of the wheel lying within the outer casing and adapted to pass movably through said apertures in said outer casing and said tubes and be attached to said bars.

3. A vehicle wheel comprising a rigid outer casing with a series of apertures formed in its inner surface, a plurality of tubes transversely disposed at regular intervals within said casing, with apertures formed on the inner surface of each tube, a plurality of bow shaped springs fastened at one end only disposed within each of said tubes, a bar disposed within each of said tubes bearing against said springs, and a series of rods rigidly attached to a portion of the wheel lying within the outer casing and adapted to pass movably through said apertures in said outer casing and said tubes and be attached to said bars.

4. A vehicle wheel comprising a rigid outer casing with a series of apertures formed in its inner surface, a plurality of tubes transversely disposed at regular intervals within said casing, with apertures formed on the inner surface of each tube, a plurality of springs disposed within each of said tubes, a spring-actuated extensible bar within each of said tubes, enlarged at its center into a spherical portion fitting between said springs, the ends of which extensible bar are adapted to be kept in constant contact with the outer casing, and a forked rod connected to each of said extensible bars, passing movably through said apertures in said tubes and said outer casing and connected to a portion of the wheel lying within the outer casing.

5. A vehicle wheel comprising a rigid outer casing with a series of apertures formed in its inner surface, a plurality of tubes transversely disposed at regular intervals within said casing, with apertures formed on the inner surface of each tube, a plurality of bow shaped springs disposed within each of said tubes, a spring-actuated extensible bar within each of said tubes enlarged at its center into a spherical portion fitting between said springs, the ends of which extensible bar are adapted to be kept in constant contact with the outer casing, and a forked rod connected to each of said extensible bars passing movably through said apertures in said tubes and said outer casing and connected to a portion of the wheel lying within the outer casing.

6. A vehicle wheel comprising a rigid outer casing with a series of apertures formed in its inner surface, a plurality of tubes transversely disposed at regular intervals within said casing, with apertures formed on the inner surface of each tube, a plurality of bow shaped springs, fastened at one end only, disposed within each of said tubes, a spring-actuated extensible bar within each of said tubes enlarged at its center into a spherical portion fitting between said springs, the ends of which extensible bar are adapted to be kept in constant contact with the outer casing, and a forked rod connected to each of said extensible bars passing movably through said apertures in said tubes and said outer casing, and connected to a portion of the wheel lying within the outer casing.

7. A vehicle wheel comprising a rigid outer casing with a series of apertures formed in its inner surface, a plurality of tubes transversely disposed at regular intervals within said casing with apertures formed on the inner surface of each tube, a plurality of bow shaped springs, fastened at one end only, disposed within each of said tubes, a smaller tube disposed within each of said tubes divided into two chambers by a central transverse partition and enlarged at its center into a spherical portion adapted to fit between said springs, a plug within each of said chambers, the outer end of which is shaped to conform to the shape of the outer casing, a spiral spring within each of said chambers adapted to bear against the transverse partition and the plug and force said plug into contact with the outer casing, a series of forked rods adapted to movably pass respectively through said apertures in said outer casing, the prongs of said rods being adapted to movably pass respectively through said apertures formed in each of said larger tubes and to be attached to the surface of said smaller tubes, the ends of said rods outside of said outer casing being adapted to be connected to a portion of the wheel lying within the outer casing.

In witness whereof, I have hereunto subscribed my name in the presence of two witnesses.

JOHN F. ROBERTSON.

Witnesses:
ALICE B. LANSING,
JAMES B. DEVITT.